United States Patent [19]

Frenette

[11] Patent Number: 5,031,927
[45] Date of Patent: Jul. 16, 1991

[54] SEMI-AUTOMATIC ATTACH DEVICE FOR MOUNTING SNOWPLOWS

[76] Inventor: Albert E. Frenette, Mountain Rd., Northwood, N.H. 03261

[21] Appl. No.: 379,909

[22] Filed: Jul. 14, 1989

[51] Int. Cl.$^5$ .................................. B60D 1/00
[52] U.S. Cl. .................... 280/481; 280/509; 37/231
[58] Field of Search ............ 37/231, 235, 196; 414/686, 723, 724, 680, 685, 721, 722; 172/275, 817, 272, 810, 811; 280/509, 510, 481; 213/88–89, 175

[56] References Cited

U.S. PATENT DOCUMENTS

| 731,707 | 6/1903 | Putnam | 280/510 |
|---|---|---|---|
| 752,300 | 2/1904 | Randolph Jr. | 280/509 |
| 784,927 | 3/1905 | Crisler | 280/510 |
| 816,218 | 3/1906 | Clay | 280/510 |
| 831,977 | 9/1906 | Nilsen | 280/510 |
| 1,690,558 | 11/1928 | Staley | 280/509 |
| 2,050,518 | 8/1936 | Baumgardner | 280/510 |
| 2,437,607 | 3/1948 | Kuchar | 280/509 |
| 2,547,772 | 4/1951 | Peters | 280/509 |
| 2,597,096 | 5/1952 | Harris | 280/509 |
| 2,979,137 | 4/1961 | Hess | 280/510 |
| 3,512,804 | 5/1970 | Siegert | 37/231 X |
| 3,964,622 | 6/1976 | Blair et al. | 414/723 |
| 4,187,050 | 2/1980 | Barbee | 414/723 |
| 4,462,172 | 7/1984 | Caron | 37/231 |
| 4,632,595 | 12/1986 | Schaeff | 414/723 X |

FOREIGN PATENT DOCUMENTS

| 1100114 | 9/1955 | France | 280/509 |
|---|---|---|---|
| 6397410 | 4/1988 | Japan | 280/510 |

Primary Examiner—Randolph A. Reese
Assistant Examiner—Franco S. DeLiguori
Attorney, Agent, or Firm—Davis, Bujold & Streck

[57] ABSTRACT

A semi-automatic attach-detach snowplow mounting comprising two mounting mechanisms each comprising a pivotally mounted U-shaped latch member which cooperates with a slot to captively hold a mounting pin, the latch member being locked in place by a locking lever when in a first position and permitted to pivot to release the mounting pin in a second position of the locking lever. The locking lever being spring biased to both of its positions.

8 Claims, 1 Drawing Sheet

SEMI-AUTOMATIC ATTACH DEVICE FOR MOUNTING SNOWPLOWS

This invention relates to a semi-automatic quick attach detach device for mounting snowplows to trucks.

BACKGROUND OF THE INVENTION

Present arrangements for mounting snowplows to the front of trucks involve the careful alignment of the plow and the truck to enable mounting pins to be manually inserted through holes in brackets on the plow and holes in brackets on the truck whereby the two may be connected for operation. In addition, a plow attitude connection is required but this additional is not a part of the present invention and remains unaltered from the existing design.

It is an object of the present invention to overcome the arduous, time-consuming restrictions placed on the attachment of a snowplow to a truck by the present manual systems with their requirement for the accurate alignment of mounting holes on these two substantial pieces of equipment often by a lone individual working in adverse weather conditions.

SUMMARY OF THE INVENTION

According to the invention there is provided a semi-automatic quick attach-detach mounting for mounting a snowplow to a truck by means of
a) a pin;
b) a slot member defining a slot having an open end to receive said pin and a closed end;
c) a U-shaped latch member, having a base and first and second arms forming the U-shape, pivotable relative to said slot member about a pivot axis, in the region of the base and fixed relative to said slot member, for pivotal movement limited by stop means, fixed relative to said slot member, between a first position in which a said pin when received in said slot adjacent its closed end is captively held in said slot by said first arm and a second position in which a said pin when entering said open end of said slot can engage said second arm to pivot said latch member to said first position as the pin moves along the slot to its closed end; and
d) a locking lever pivotally mounted for pivotal movement, relative to said slot member about an axis fixed relative said slot member, between first and second positions limited by stop means fixed relative to said slot member, said locking lever in its first position cooperating with said second arm to prevent pivotal movement of said latch member when said latch member is in its first position, said locking lever in its first position being pivotable against the bias of a spring means when said latch member is in its second position to allow said latch member to pivot to its first position and said locking lever in said its second position allowing said latch member to pivot from its first position to its second position to release a said pin from said slot, said spring means acting to bias said locking lever to into its first position, when the locking lever is in its first position, and into its second position, when the locking lever is in its second position.

The invention will now be described, by way of example, with reference to the accompanying drawings, in which:

DESCRIPTION OF THE INVENTION

Figure 1:
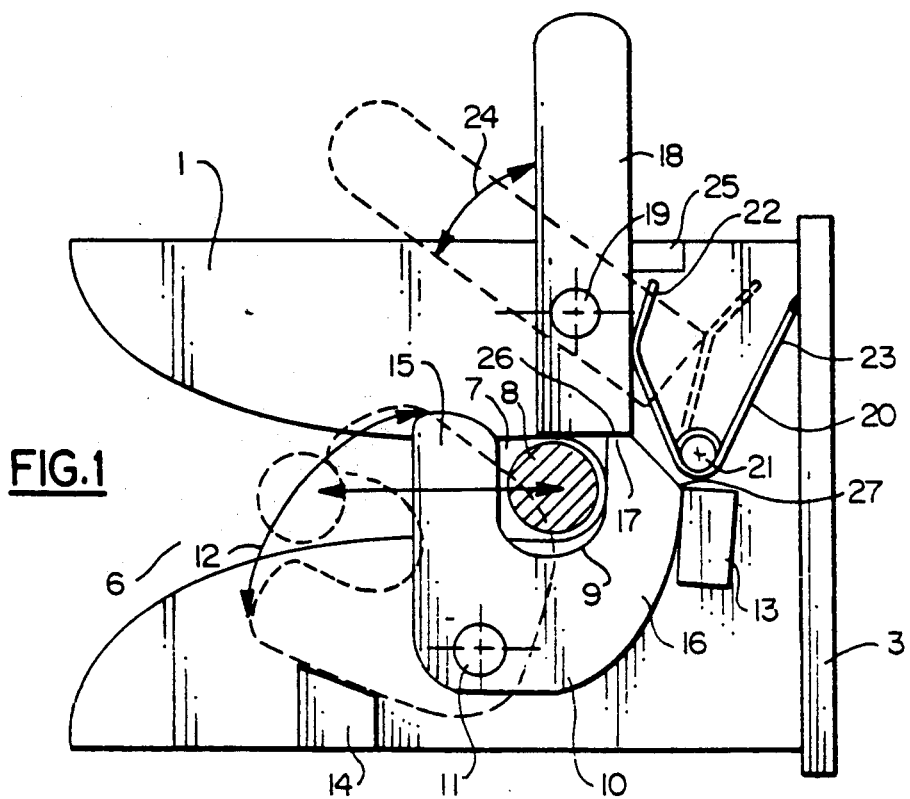
FIG. 1 is a diagrammatic representation of a semi-automatic attachment device of the present invention.

With reference to the drawings, first and second side plates (1) and (2) (side plate 1 only being shown in FIG. 1) are interconnected by a mounting plate (3) in each of the two attachment devices (4) and (5) forming the means for mounting a plow to a truck in accordance with the present invention. The side plates (1) and (2) are mounted in parallel spaced apart relationship with both of the side plates (1) and (2) being identical in shape. The shape of each side plate is rectangular in overall configuration and includes a cut-out or slot extending from the side of the rectangle opposite that to which the mounting plate (3) is attached by welding. That cut-out defines a wide opening (6) curved inwardly to a substantially parallel portion (7) of a width to closely restrict a pin (8) of a diameter for which the attachment device is designed. The parallel portion (7) ends in a closed semi-circular shape (9) of a diameter slightly larger than pin (8).

A generally U-shaped latch member (10) is pivotally mounted to the side plates (1) and (2) for pivotal movement therebetween about pivot (11) fixed relative to said side plates (1) and (2), between the position shown by solid lines and that shown in ghost, through an arc defined by arcuate line (12). Pivotal movement in a clockwise direction to the position shown by solid lines is limited by a stop (13) disposed fixedly between the side plates (1) and (2) and in an anti-clockwise direction to the position shown in ghost is limited by a stop (14) also fixedly attached between the side plates (1) and (2).

When in the position shown with solid lines, the U-shaped latch member (10) has one arm (15) of the U extending across the parallel portion (7) of the opening in the side plates (1) and (2) to retain pin (8) within the opening while the U-shaped member stays in that position. The other arm (16) of the U-shaped member defines an end portion in the form of an anvil (17) which in the position shown by solid lines is engaged by a locking lever (18) pivotally mounted in the space between the side plates (1) and (2) for pivotal movement about a pivot pin (19) fixedly located relative to the side plates (1) and (2). The locking lever (18) is biased by a hairpin spring (20) which is coiled about a spring retaining pin (21) fixedly disposed relative to said side plates (1) and (2) with spring arms (22) and (23) extending from the coiling of the spring about pin (21) into contact respectively with the locking lever (18) and the mounting plate (3). The locking lever is capable of pivotal movement about pivot (19) from the position shown in solid lines to that shown in ghost. This movement being represented by arcuate line (24), the end positions of which are defined by engagement of the locking lever with a stop (25) fixedly attached between the side plates (1) and (2). The hairpin spring (20) is also positioned between the side plates (1) and (2). In the position shown for the locking lever in solid lines, the hairpin spring (20) acts to bias the locking lever in a clockwise direction as seen in FIG. 1 while in the position shown in ghost for the locking lever, the hairpin spring acts through the other side of pivot (19) thereby, in this position, to bias the locking lever (18) in an anti-clockwise direction (as seen in FIG. 1). Accordingly, the locking lever (18) has two stable positions, one of which is shown by solid lines and the other of which is shown in ghost.

With the locking lever (18) in a position shown by solid lines, the end (26) of the locking lever (18) engages the anvil (17) of the U-shaped member (10) whereby any force trying to remove the pin (8) from the opening (6) will result in a force tending to move the locking lever (18) in a clockwise direction (as seen in FIG. 1), which movement is prevented by the stop (25). By virtue of this, the locking lever in the positions shown by solid lines prevents anti-clockwise rotation of the U-shaped member (10) about its pivot (11), which movement would serve to release the pin (8) from the opening (6).

When release of the pin (8) from the opening (6) is desired, the locking lever (18) is moved into the stable position shown in ghost and the U-shaped member (10) is then free to pivot to the position shown in ghost while at the same time the pin can move toward open end (6) for release from the attachment device. This action is achieved by backing the truck away from the snowplow once the lever has been manually moved to the position shown in ghost. It will be appreciated that the base of the U-shaped member (10) and the location of its pivot access are arranged to allow the pin (8) to move along the parallel portion (7) of the slot at the same time as the U-shaped member (10) moves between the position shown in solid lines and that shown in ghost.

When a snow plow is to be attached to a truck which carries the semi-automatic quick attach-detach arrangement of the present invention, the locking lever (18) is placed in the position shown in solid while the U-shaped member occupies the position shown in ghost. The truck is moved forward so that the pin which is a part of the plow enters the opening (6) until it comes in contact with the U-shaped member (10) adjacent to the anvil (17). From this point on, the interaction of the pin (8) with the U-shaped member causes that U-shaped member to rotate toward the position that shown by solid lines in FIG. 1. In order to reach that position, the arm (16) of the U-shaped member engages the locking lever (18) and forces it against the bias of the hairpin spring in an anti-clockwise direction about its pivot (as seen in FIG. 1) until the U-shaped member can pass the locking lever into the position shown by solid lines for the U-shaped member. When this occurs, the locking lever (18) returns to the position shown by solid lines under the bias of the hairpin spring (20) to engage the anvil (17) and lock the U-shaped member into place with the pin (8) captively held in the inner end of the parallel portion (7) of the opening (6).

It will be appreciated that adjacent the anvil (17) of the U-shaped member, the end of the associated arm of the U-shaped member may be relieved to form a surface (27) facilitating a camming action on the locking lever (18) to provide the appropriate interaction for movement of the locking lever (18) during an engagement of the mechanism with a pin (8) of a snowplow.

Figure 2:
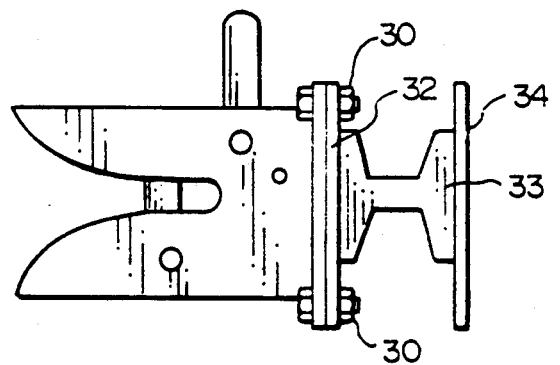
FIG. 2 is a side elevation of a mounting assembly according to the present invention.
Figure 3:
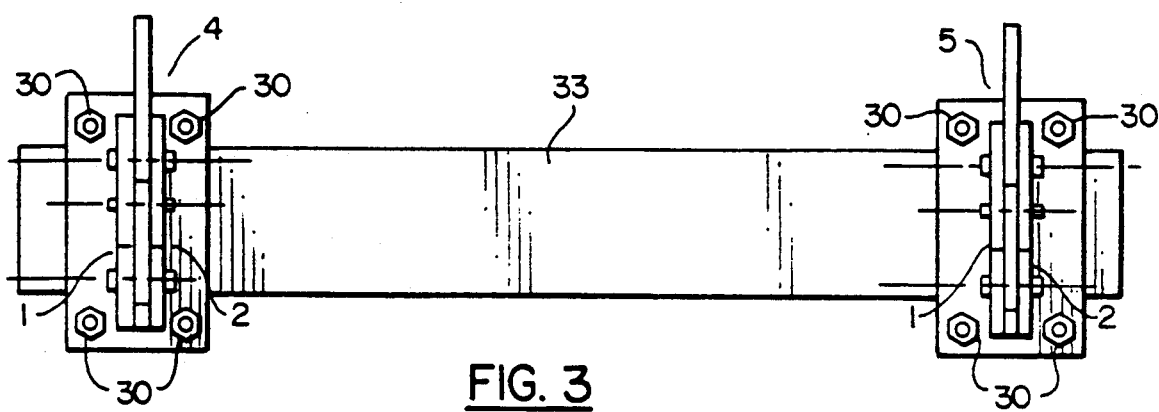
FIG. 3 is a front elevation of the plow mounting assembly of the present invention comprising two of the attachment devices illustrated diagrammatically in FIG. 1 interconnected by a support beam with mounting arrangements for attaching this to the chassis of a truck.

With reference particularly to FIGS. 2 and 3, a pair of the devices described in detail with respect to FIG. 1 are mounted by means of bolts (30) to plates (32) welded to a transverse I-beam (33) at space locations appropriate for the mounting of the snowplow concerned to a truck with the I-beam carrying further mounting plates (34) by which the assembly may be permanently attached to the chassis of a truck in a manner known per se.

It will be appreciated that guide surfaces on one of the plow or the truck and a guide member(s) on the other of these may be provided to facilitate horizontal and/or vertical alignment of the mounting pins and the latches.

I claim:

1. A semi-automatic quick attach-detach mounting device for mounting a snowplow to a truck comprising:
   a) a pin;
   b) a slot member defining a slot having an open end to receive said pin and a closed end;
   c) a U-shaped latch member, having a base and first and second arms forming the UK-shape, pivotable relative to said slot member about a pivot axis fixed, in the region of said base, relative to said slot member, said pivotal movement limited by first stop means, fixed relative to said slot member, between a first position in which said pin, when received in said slot adjacent said closed end, is captively held in said slot by said first arm and a second position in which said pin, when entering said open end of said slot, can engage said second arm to pivot said latch member to its first position as the pin moves along said slot to said closed end; and
   d) a locking lever pivotally mounted for pivotal movement, relative to said slot member about a pivot axis fixed relative said slot member, between first and second positions limited by second stop means fixed relative to said slot member, said locking lever in its first position directly cooperating with said second arm to prevent pivotal movement of said latch member when said latch member is in its first position, said locking lever in its first position being pivotable against the bias of spring means when said latch member is in its second position to allow said latch member to its first position and said locking lever in its second position allowing said latch member to pivot from its first position to its second position to release said pin from said slot, and said spring means acting to bias said locking lever into its first position, when the locking lever is in its first position, and into its second position, when the locking lever is in its second position.

2. A mounting device according to claim 1 wherein said spring means is a hairpin spring located on a pin fixed relative to said slot member and which provides spring bias to said lever into each of its first and second positions.

3. A mounting device according to claim 1 wherein said pin defines an axis and said slot member is a flat plate member defining said slot with said slot being of decreasing width from said open end towards said closed end with a portion of said slot adjacent said closed end being of substantially constant width to closely accommodate said pin and wherein the pivot axis of said latch member and said locking lever and said pin axis, when said pin is captive in said slot, are all parallel to one another.

4. A mounting device according to claim 3 wherein said locking lever defines an end which, in said first position of the locking lever, engages an end portion of the second arm of said latch member whereby a force applied by said end portion of said second arm, as said latch member is urged from its first position toward its second position, acts to urge said locking lever toward its first position against said second stop means thereby to prevent the movement of said latch member from its first position.

5. A mounting device according to claim 4 wherein said second stop means is a single stop which the lever engages in both its first and second positions.

6. A mounting device according to claim 3 comprising a further slot member defining a slot, said further slot member being in the form of a plate disposed in a horizontally spaced parallel relationship to the first mentioned slot member with the slots of said slot members aligned with one another, and said latch member, an end of said locking lever which engages an end portion of the second arm of the latch member and said spring means are disposed therebetween.

7. A mounting according to claim 6 wherein said plate members are attached together by a mounting plate and said stop means.

8. A mounting assembly incorporating two semi-automatic quick attach-detach mounting devices, for mounting a snowplow to a truck by two spaced apart pins of the plow, said mounting device comprising:
 a) a pin;
 b) a slot member defining a slot having an open end to receive said pin and a closed end;
 c) a U-shaped latch member, having a base and first and second arms forming the U-shape, pivotable relative to said slot member about a pivot axis fixed, in the region of the base, relative to said slot member, said pivotal movement limited by first stop means, fixed relative to said slot member, between a first position in which said pin when received in said slot adjacent said closed end is captively held in said slot by said first arm and a second position in which said pin when entering said open end of said slot can engage said second arm to pivot said latch member to its first position as the pin moves along said slot to said closed end;
 d) a locking lever pivotally mounted for pivotal movement, relative to said slot member about a pivot axis fixed relative said slot member, between first and second positions limited by second stop means fixed relative to said slot member, said locking lever in its first position directly cooperating with said second arm to prevent pivotal movement of said latch member when said latch member is in its first position, said locking lever in its first position being pivotable against the bias of spring means when said latch member is in its second position to allow said latch member to pivot to its first position and said locking lever in its second position allowing said latch member to pivot from its first position to its second position to release said pin from said slot, and said spring means acting to bias said locking lever in to its first position, when the locking lever is in its first position, and into its second position, when the locking lever is in its second position;
 e) said pin defines an axis and said slot member is a flat plate defining said slot with said slot being of decreasing width from tis open end towards its closed end with a portion of the slot adjacent said closed end being of substantially constant width to closely accommodate said pin and wherein the pivot axis of the latch member and the locking lever and said pin axis, when said pin is captive in said slot, are parallel to one another;
 f) a pin and a further slot member, defining a slot having an open end to receive said pin, in the form of a plate disposed in spaced parallel relationship to the first mentioned slot member with the slots of said slot members aligned with one another, and said latch member, an end of said locking lever which engages an end portion of the second arm of the latch member and said spring means are disposed therebetween;
 g) said plate members being attached together by a mounting plate and said first and second stop means; and
wherein said two mountings are spaced apart and supported, by a transverse member, so that they each engage and support one of said two pins which are substantially axially aligned with one another.

* * * * *